April 25, 1950     A. H. HAVIR     2,505,543
BRAKE WITH RELEASE

Filed April 26, 1948     2 Sheets-Sheet 1

INVENTOR
ANDREW H. HAVIR
BY G. H. Braddock
ATTORNEY

Patented Apr. 25, 1950

2,505,543

UNITED STATES PATENT OFFICE 2,505,543

BRAKE WITH RELEASE

Andrew H. Havir, St. Paul, Minn.

Application April 26, 1948, Serial No. 23,349

2 Claims. (Cl. 188—110)

This invention has relation to a brake with release devised to be employed in connection with a crankshaft of a machine, such, for example, as a punch press, including a stationary lower member and a movable upper member adapted to be reciprocated relative to said stationary lower member in response to operation of said crankshaft.

The movable upper member of a machine of character as above set forth ordinarily is situated substantially at the upper limit of its upstroke when the machine is at rest. When said machine is set in motion, as, for example, in response to depression of a foot pedal, its crankshaft is power actuated to cause its movable upper member to make one downstroke and one upstroke and released upon approach of said movable upper member toward the upper limit of each upstroke, and a brake, commonly including a brake drum on the crankshaft, operates upon release of said crankshaft to bring said movable upper member to rest at the upper limit of each of its upstrokes.

The object of the present invention is to provide in a machine including a stationary lower member, a movable upper member and a crankshaft adapted to be operated by power actuated means to accomplish alternate downstrokes and upstrokes of the movable upper member toward and away from the stationary lower member and released from said power actuated means upon approach of said movable upper member toward the upper limit of each of its upstrokes, a new and improved brake incorporating a construction and arrangement, or mechanism, adapted to be operative to remove braking tension from said crankshaft upon commencement of each downstroke of said movable upper member in response to operation of the crankshaft by said power actuated means, maintain no braking tension on said crankshaft during substantially the whole of each downstroke and upstroke of the movable upper member in response to operation of the crankshaft by said power actuated means and apply braking tension to said crankshaft when released from the power actuated means upon approach of said movable upper member toward the upper limit of each of its upstrokes adapted to cause the movable upper member to be brought to rest when it reaches substantially the upper limit of each of its upstrokes.

In the accompanying drawings forming a part of this specification,

Figure 2:
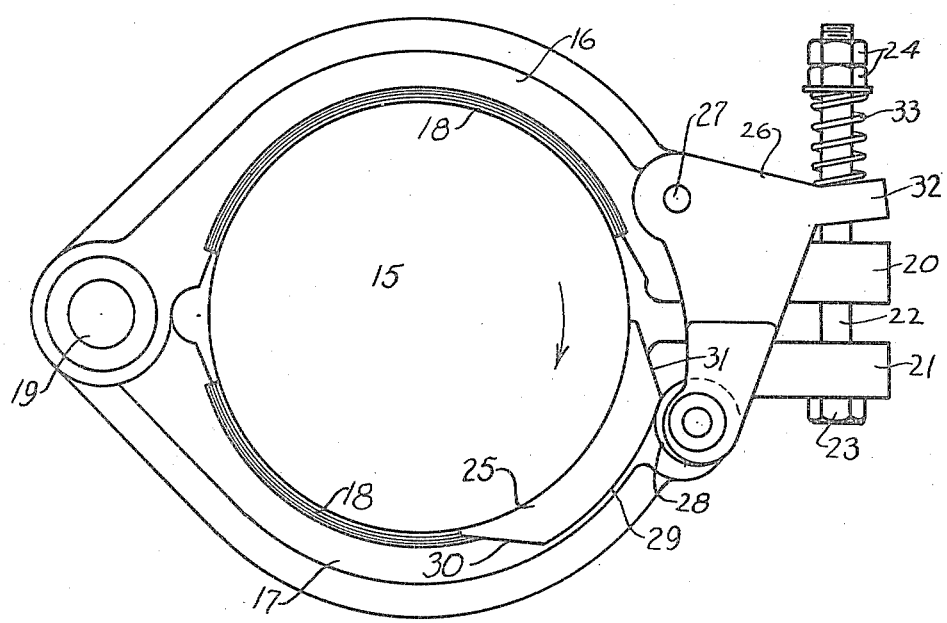
Fig. 2 is an enlarged end elevational view of the brake with release of the machine of Fig. 1 as it would appear from the left in said Fig. 1.

With respect to the drawings and the numerals of reference thereon, 10 denotes a machine including a stationary lower member 11, a movable upper member 12 adapted to be reciprocated toward and away from said stationary lower member, a crankshaft 13 suitably and conveniently rotatably supported upon the frame of said machine and assembled with said movable upper member and a fly wheel or pulley 14 on an end portion of said crankshaft adapted to be rotated by power actuated means to in turn cause the crankshaft 13 to be rotated thus to cause said movable upper member to be reciprocated.

A brake drum 15 is rigidly fixed upon the crankshaft 13, at the end thereof opposite the fly wheel or pulley 14 in the disclosure as made, and brake levers, designated 16 and 17, respectively, support brake linings 18, 18 adapted to be pressingly engaged with and released from diametrically opposite surfaces of said brake drum 15. An end portion of each of the brake levers 16 and 17 is rotatably mounted, for swinging movement of said brake levers toward and away from the brake drum 15, upon a pivot pin 19 rigidly supported on the frame of the machine 10 at a side of said brake drum, and the brake levers are of arcuate configuration. Spaced apart, parallel end portions, represented 20 and 21, respectively, of the brake levers 16 and 17, at the side of the brake drum 15 opposite the pivotal support 19, are slidably situated on a guide rod 22 between a head 23 on an end of said guide rod and nuts 24 adjustable upon an end portion of the guide rod opposite said head. Said guide rod 22 is disposed in perpendicular relation to the pivotal support 19.

An instrumentality for applying braking tension to the brake drum 15, in response to forcible rotation of the brake levers 16 and 17 toward each other, and for removing braking tension from said brake drum, by release of said brake levers, includes a cam 25 fixed upon the brake drum and disposed exteriorly of the brake linings 18, 18 in clearing relation to the brake levers, an actuator 26 pivotally supported, as at 27, upon a part of the brake lever 16 adjacent its end portion 20, and a roller 28 mounted on a main body part of said actuator 26 in spaced relation to the pivotal support 27. Said pivotal support 27 is substantially alined with the guide rod 22 in direction transversely of the brake drum 15 and is disposed in parallel relation to and at the side of said brake drum opposite the pivotal support 19, and said roller 28 is situated at the side of the end portion 21 opposite the end portion 20.

The cam 25 includes an exterior arcuate surface 29 extending circumferentially of the brake drum and forward and rearward oblique surfaces, indicated 30 and 31, respectively, the former extending outwardly from about the periphery of the brake drum 15 to the forward end of the arcuate surface 29 and the latter extending inwardly from the rearward end of said arcuate surface 29 to about the periphery of said brake drum.

The roller 28 and the main body part of the actuator 26 which supports said roller are situated exteriorly of and in clearing relation to the brake linings and levers, and the cam 25 and said roller 28 are disposed in alined relation in direction transversely of the brake drum 15.

An extension piece 32, rigid with the main body part of the actuator 26 and in spaced relation to the pivotal support 27 at the side thereof opposite the brake drum 15, is offset interiorly of said main body part and slidably situated in spaced relation to the end portion 20 upon a part of the guide rod 22 between said end portion 20 and the nuts 24.

A compression coil spring 33, for actuating the brake levers 16 and 17 to cause braking tension to be applied to the brake drum 15, is situated upon said guide rod 22 between said nuts 24 and the extension piece 32.

The arcuate surface 29 of the cam 25 can be continuous throughout any preferred arc, but desirably, said arcuate surface can be continuous throughout an arc about as disclosed in Fig. 2 of the drawings.

The cam 25 is adapted to force the roller 28 outwardly once during each revolution of the brake drum 15, and the arcuate surface 29 of said cam is adapted to retain said roller 28 in its outwardly forced position for the whole of the interval during each revolution of said brake drum while said arcuate surface is engaged beneath said roller. Outward forcing of the roller 28 will cause the actuator 26 to be swung outwardly on the pivotal support 27 as an axis and the extension piece 32 to be swung in direction toward the compression coil spring 33. The construction and arrangement will be such that the forward oblique surface 30 of the cam 25 upon riding under the roller 28 will cause said roller to be swung outwardly a sufficient distance so that when the arcuate surface 29 of said cam is engaged beneath said roller the extension piece 32 will be situated to urge the head 23 on the guide rod 22 up against the end portion 21 of the brake lever 17 and retain the compression coil spring compressed between said extension piece and the nuts 24 thus to cause said compression coil spring to be loaded and the brake linings of the brake lever to be resiliently pressed against the brake drum 15. It will be apparent that the compression coil spring 33 when placed under confinement, in the manner as set forth, simultaneously will exert resilient effort upon the brake levers 16 and 17, through the instrumentality of the extension piece 32 while retained by the cam 25 against rotative movement relative to said brake levers, the guide rod 22 and the head 23 and the nuts 24 on said guide rod, adapted to cause said brake levers to be rotatably urged toward each other. The construction and arrangement also will be such that when the cam 25 is removed from beneath the roller 28 the actuator 26 will be capable of having free rotative movement, in clockwise direction in Fig. 2, to a sufficient extent to permit the compression coil spring 33 to be capable of having sufficient expansion to be under zero compression to exert no confining effort upon the brake levers tending to apply braking tension to the brake drum 15.

Figure 1:
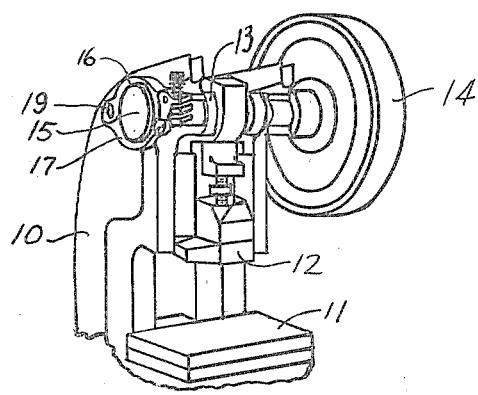
Fig. 1 is a fragmentary perspective view of a machine including a stationary lower member and a movable upper member adapted to be reciprocated relative to said stationary lower member in response to operation of a power actuated crankshaft of the machine and also including a brake with release made according to the invention.
Figure 3:
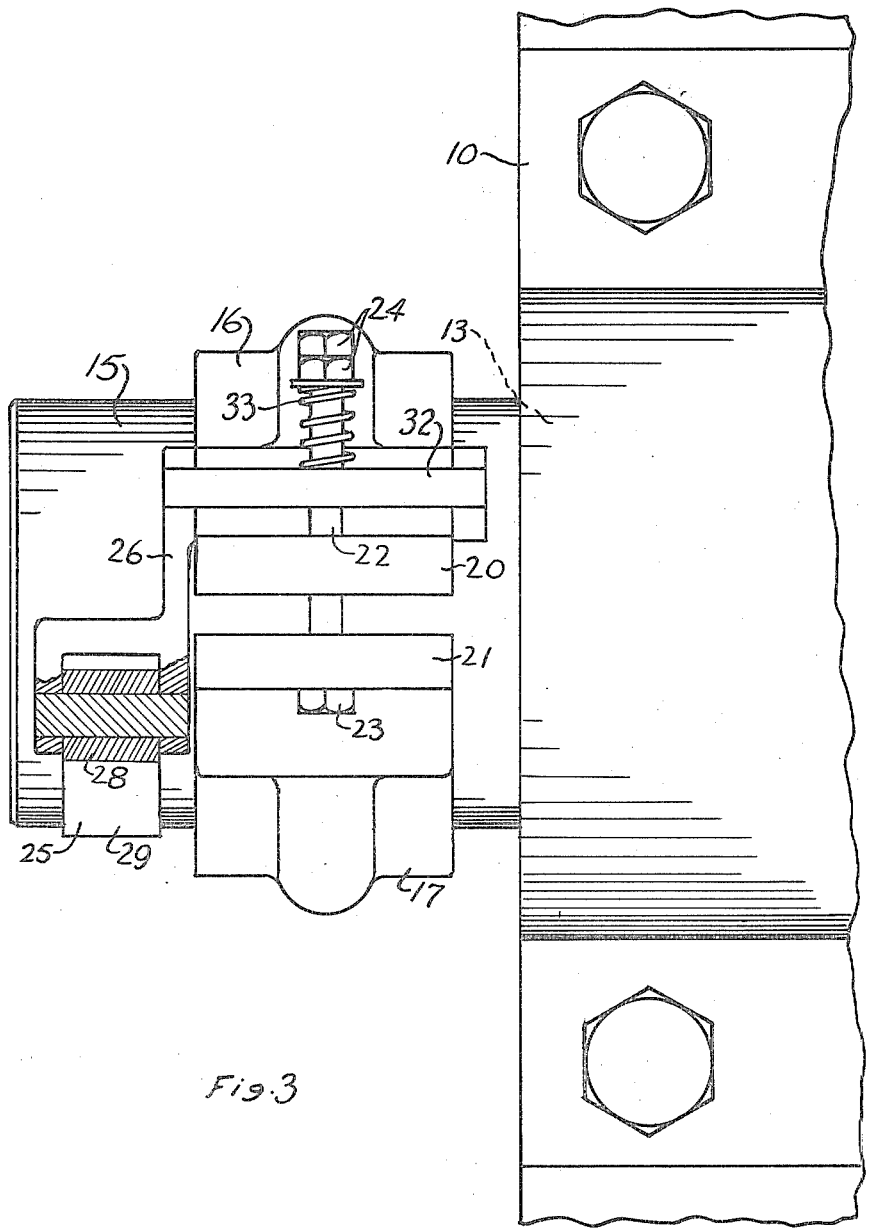
Fig. 3 is a fragmentary side elevational view, partially in section, of the disclosure of Fig. 2 as it would appear from the right in said Fig. 2, also disclosing a portion of the machine of Fig. 1.

The machine 10 is disclosed in Fig. 1 of the drawings as when at rest, the movable upper member 12 being substantially at the upper limit of its upstroke and the crank shaft 13 being in position to start a downstroke of said movable upper member. In Fig. 2 the brake drum 15 is in position as when said crankshaft is at rest, as in said Fig. 1, and the rearward end position of the arcuate surface 29 of the cam 25 is engaged beneath the roller 28. Upon commencement of each downstroke of the movable upper member 12 in response to rotation of the crankshaft 13, in the direction of the arrow in Fig. 2, by power actuated means (not shown) adapted to be applied to said crankshaft through the medium of the fly wheel or pulley 14, the arcuate surface 29 will be caused to travel from beneath the roller 28 thus to cause confining effort upon the brake levers and braking tension on the brake drum to be removed. During rotation of the crankshaft by said power actuated means while the movable upper member 12 is completing substantially the whole of each of its downstrokes and upstrokes the cam 25 will be clear of the roller 28 so that the brake levers will be under no confining effort and the brake drum will be under no braking tension. The extent of the arc of the arcuate surface 29 will be such that the forward end portion of said arcuate surface will become engaged beneath said roller 28 when power actuation of the crankshaft 13 is terminated by release of said crankshaft from the power actuated means upon approach of said movable upper member toward the upper limit of each of its upstrokes, and the construction and arrangement will be such that the crankshaft will be brought to rest by application of braking tension to the brake drum 15 in response to resilient confining effort imposed on the brake levers 16 and 17 when the movable upper member reaches the upper limit of each of its upstrokes and the cam 25 is situated relative to the roller 28 about as disclosed in Fig. 2 of the drawings. Stated otherwise, braking action will be applied to the crankshaft while the arcuate surface 29 is riding beneath the roller 28, and said crankshaft will be brought to rest while the rearward end portion of said arcuate surface is yet beneath said roller.

The brake with release which the invention presents withholds braking tension from the brake drum 15 during substantially the whole of the power actuated portions of the downstrokes and upstrokes of the movable upper member 12 when braking tension is not required and is, in fact, detrimental to efficient operation by reason of the fact that brake friction generates heat liable to become excessive thus to cause failure of lubrication in main bearings and burning out of brake linings. In short, the brake illustrated and described in the present application is adapted to function to bring the crankshaft 13 to rest when released from power actuated means which drives said crankshaft, as well as to retain the crankshaft and the movable upper member 12 in their intended positions while the machine 10 is at rest. At all other times, save during the inconsequential interval the cam 25 is riding off of the rearward end of the arcuate surface 29 from its position as in Fig. 2, immediately after starting up of the machine, the new and improved brake is inoperative.

There is no positive connection between the brake actuator and the power source. The brake is operated by action of the cam upon the compression coil spring, and the construction and arrangement are such that the torque generated by the power source is of enough magnitude to drag the cam sufficiently with the brake in the on position to cause the compression coil spring to bring the brake drum to rest.

What is claimed is:

1. A brake comprising a rotatably supported brake drum adapted to be power actuated during the accomplishment of alternate downstrokes and upstrokes of a movable member and released upon approach of said movable member toward the upper limit of each of its upstrokes, first and second brake members adapted to be pressingly engaged against and released from opposite surfaces of said brake drum, means supporting said first and second brake members for movement toward and away from said brake drum, a cam rigid with said brake drum and having a circumferentially extending arcuate surface, an actuator pivotally supported upon a part of said first brake member at a side of said brake drum opposite said supporting means for the first and second brake members for swinging movement toward and away from said second brake member, a roller mounted on said actuator in position to be engaged by the arcuate surface of said cam, a guide rod adjacent said actuator at a side thereof opposite said brake drum and in perpendicular relation to the brake drum, means securing said guide rod to a part of said second brake member at a side of said brake drum opposite said supporting means for the first and second brake members, an extension piece rigid with said actuator and slidably arranged on said guide rod in spaced relation to the second brake member, a stop on said guide rod in spaced relation to said extension piece at a side thereof opposite the second brake member, and a compression coil spring on the guide rod between said extension piece and said stop, said arcuate surface of the cam being adapted to become engaged beneath said roller to cause said actuator to be rotated to cause said compression coil spring to be loaded thus to cause said first and second brake members to be pressingly urged against said brake drum and to be removed from engagement beneath said roller to release the compression coil spring to cause it to become unloaded and the first and second brake members to be released from pressing engagement against said brake drum.

2. A brake comprising a rotatably supported brake drum adapted to be power actuated during the accomplishment of alternate downstrokes and upstrokes of a movable member and released upon approach of said movable member toward the upper limit of each of its upstrokes, first and second brake members adapted to be pressingly engaged against and released from opposite surfaces of said brake drum, means supporting said first and second brake members for movement toward and away from said brake drum, a cam rigid with said brake drum and having a circumferentially extending arcuate surface, an actuator pivotally supported upon a part of said first brake member at a side of said brake drum opposite said supporting means for the first and second brake members for swinging movement toward and away from said second brake member, means supported by said actuator in position to be engaged by the arcuate surface of said cam, an elongated element adjacent said actuator at a side thereof opposite said brake drum and secured to said second lever in perpendicular relation to the brake drum, a member rigid with said actuator at the side thereof opposite said brake drum and slidably arranged on said elongated element at a side of said first brake member opposite said second brake member, a stop rigid with said elongated element at a location in spaced relation to said member at a side thereof opposite said second brake member, and a compression coil spring on said elongated element between said member and said stop, said arcuate surface of the cam being adapted to become engaged beneath said means to cause said actuator to be rotated toward said compression coil spring to cause it to be loaded thus to cause said first and second brake members to be pressingly urged against said brake drum and to be removed from engagement beneath said means to release said compression coil spring to cause it to become unloaded and the first and second brake members to be released from pressing engagement against said brake drum.

ANDREW H. HAVIR.

REFERENCES CITED

The following references are of record in the file of this patent:

UNITED STATES PATENTS

| Number | Name | Date |
|---|---|---|
| 704,534 | Greenwood | July 15, 1902 |

FOREIGN PATENTS

| Number | Country | Date |
|---|---|---|
| 17,740 | France | July 31, 1912 |
| 387,200 | Great Britain | Feb. 2, 1933 |
| 536,228 | France | Apr. 28, 1922 |